July 1, 1969 J. H. POMERENE 3,453,597

MULTI-STATION DIGITAL COMMUNICATION SYSTEM WITH EACH STATION ADDRESS OF SPECIFIC LENGTH AND COMBINATION OF BITS

Filed July 6, 1965

Sheet 1 of 2

INVENTOR
JAMES H. POMERENE

BY [signature]
ATTORNEY

July 1, 1969 J. H. POMERENE 3,453,597

MULTI-STATION DIGITAL COMMUNICATION SYSTEM WITH EACH STATION ADDRESS OF SPECIFIC LENGTH AND COMBINATION OF BITS

Filed July 6, 1965

Sheet 2 of 2

United States Patent Office 3,453,597
Patented July 1, 1969

3,453,597

MULTI-STATION DIGITAL COMMUNICATION SYSTEM WITH EACH STATION ADDRESS OF SPECIFIC LENGTH AND COMBINATION OF BITS

James H. Pomerene, Poughkeepsie, N.Y., assignor to International Business Machines Corporation, Armonk, N.Y., a corporation of New York Filed July 6, 1965, Ser. No. 469,573
Int. Cl. H04q *9/00*
U.S. Cl. 340—147 5 Claims

ABSTRACT OF THE DISCLOSURE

A multi-station data communication system in which each station is addressable by a common transmitting station. The common station provides an address start signal prior to address signals and an address stop signal following the address signals so that a particular station recognizes an address of only a particular length and of a particular combination of bits as its address. The number of stations can thus be increased without limit and without converting the address registers of existing stations to handle larger addresses.

Figures 1, 1A:
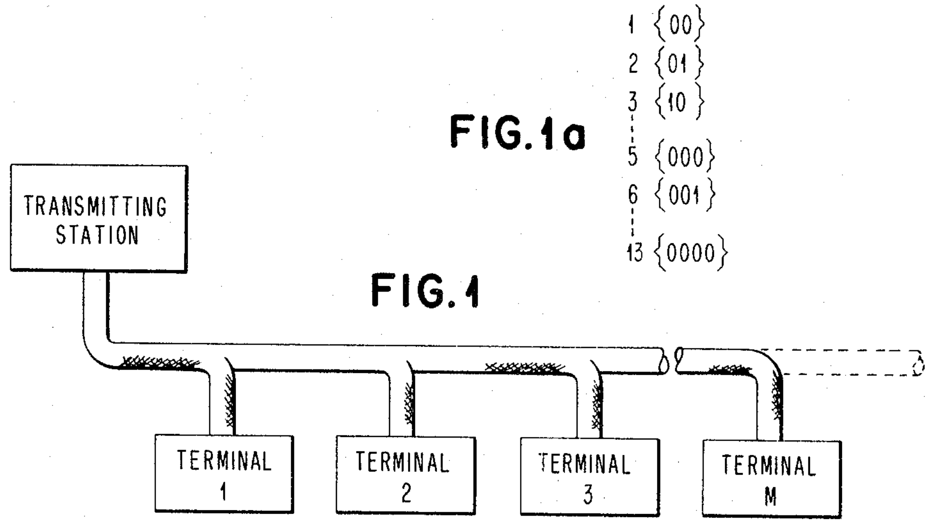

This invention relates to a multi-station communication system, and more particularly to means for addressing any one of a plurality of stations of a digital communication system.

In many time-sharing data processing systems, such as airline and train reservation systems, a central processing station is adapted to supply and transmit data to many remote substations. When it is required that data be transmitted to a particular station, the central unit first sends out an address signal that is recognizable only by one particular substation to indicate to that substation that data signals for that station are about to be transmitted. In more complex systems, the data transmission does not follow until the substation has acknowledged that it is ready to receive data. However, in systems such as information retrieval systems where the central unit is merely a file unit, the data may immediately follow the address which acts as a key or a flag signal to tell the particular substation to start receiving data. The data transmission may be a result of an original request from a particular substation for data or the data transmission may be caused by some condition external to the system itself where the substations are merely slave units to the central unit.

It is of course desirable that only one particular substation be designated to receive the data transmission since, if each of the substations were to receive the data transmission when not required to do so, the load placed upon the transmission line would be such as to require amplifiers at each of the substations as well as along the transmission line, which in turn would increase the cost of the entire system. However, when prior art systems have been employed to transmit to only one of a plurality of substations, the total number of substations has been limited by the addressing scheme employed such that the total number of substations could not be expanded without modification and redesign of the entire system. This is primarily due to the recurrent nature of numbering systems whether they be binary, octal, decimal, binary-decimal and so on. For example, if an addressing system were to employ three digits in a binary system, then it could only provide for addressing eight stations. If a ninth station were required to be addressed, then the register of each of the first eight stations would have to be changed to accommodate a fourth digit for the addressing of sixteen stations. It would be appreciated that without this change, the address for the ninth station would also act to address the first station when the three bit addressing system was employed. It would be further appreciated that when the communication system involves an extremely large number of separate stations, changes in the address registers of each of the respective stations can become costly from the point of effort and expenditure as well as from the point of time involved in the conversion to the expanded addressing scheme.

It is then, an object of the present invention to provide an improved means of addressing a plurality of stations of a communication system.

It is another object of the present invention to provide means for addressing a plurality of stations of a communication system which allow for additional stations to be added to the system without requiring any change in addressing means of the previously existing stations.

It is still another object of the present invention to provide improved means for addressing a plurality of stations of a communication system, the addresses of which stations may be of different lengths.

In prior art communication systems involving a plurality of stations, a given station was selected for receiving transmission by the presentation of a particular address which only that station recognized. If an address containing more bits or digits than the address of the particular station were presented to that station and contained the same sequence of particular bits recognizable by that station, then the station would begin to receive transmission even though the transmission was not intended for that station. In order to provide a multi-station communication system, the particular stations of which will recognize only their particular address, it becomes necessary to either inhibit the particular station from receiving transmission when a larger or smaller length address is presented, or else to provide address start and address stop signals so that the particular station will recognize only its particular address and no other.

A feature, then, of the present invention resides in transmitting means to generate a plurality of signals representing the address of a particular terminal and receiving means at that terminal to receive the transmitted signals, which signals include a first signal recognizable only as a start address signal and a last signal recognizable only as a stop address signal. The specific means of the present invention are particularly adaptable to a signal line for transmission of data in serial form, but can also be adapted to a plurality of lines for transmission of data in parallel form to accomplish the objects of the present invention.

Figure 2:
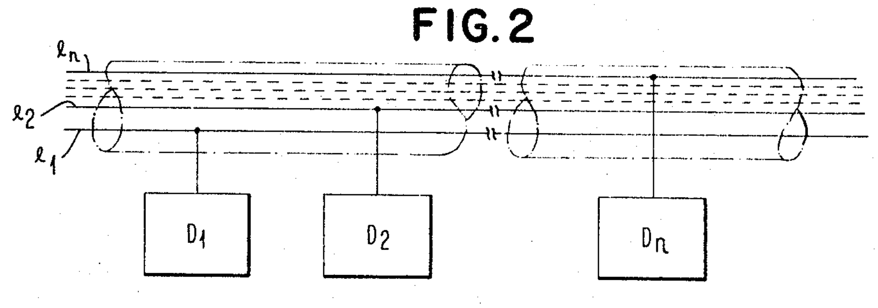
Figure 3A:
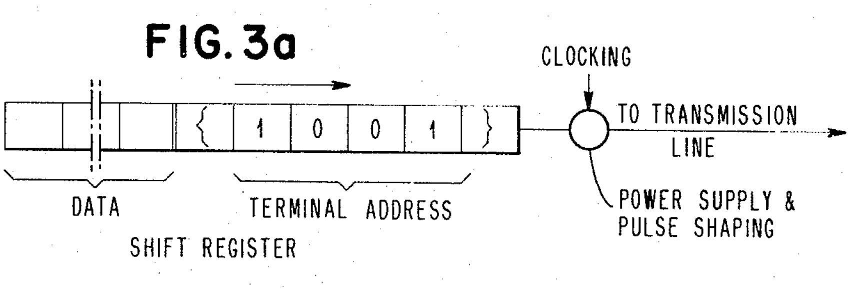
Figure 3B:
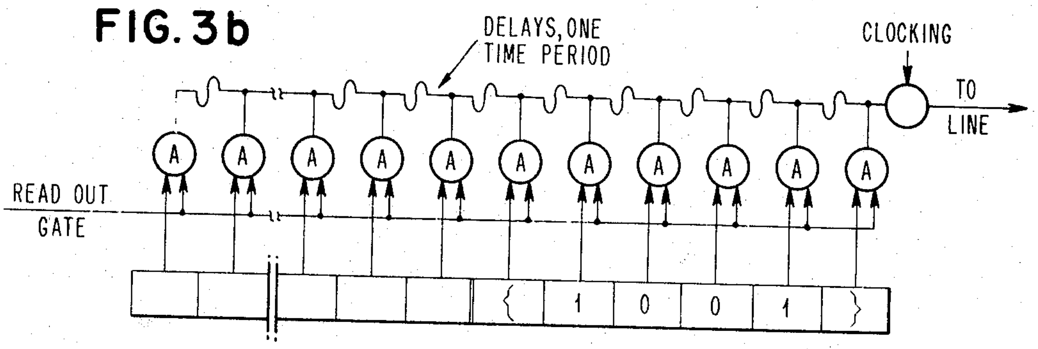
Figure 4:
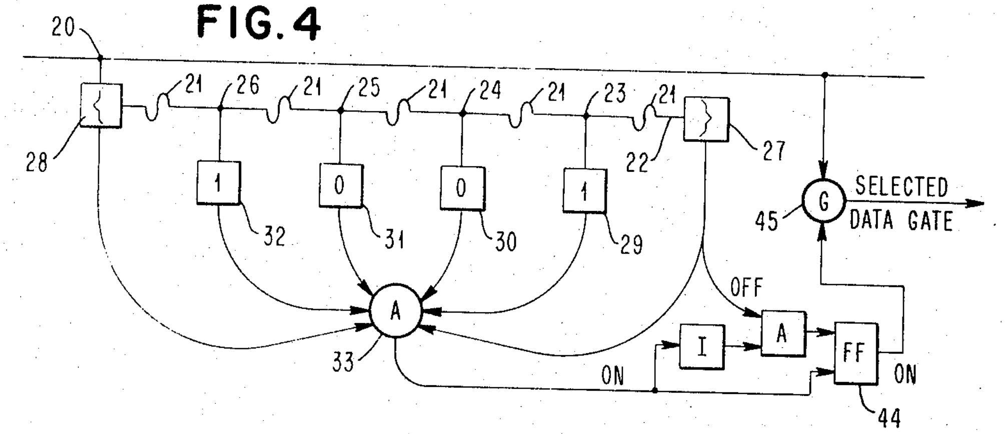
Figure 5A:
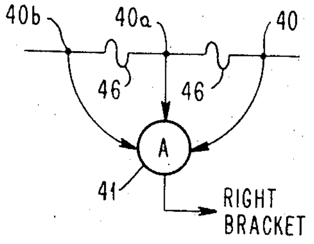
Figure 5B:
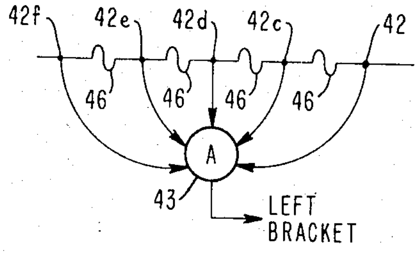
Figure 6:
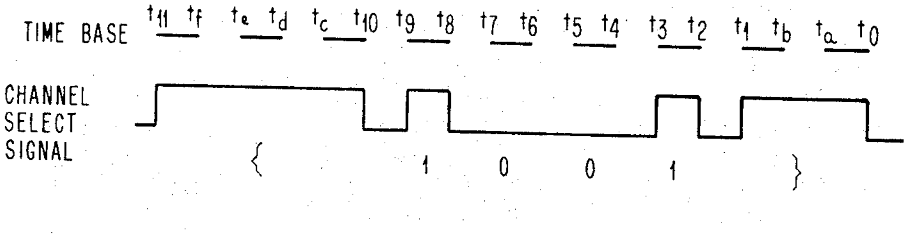

Other objects, advantages and features of the present invention will become more readily apparent from a review of the following specification, when taken in conjunction with the drawings herein:

FIGURE 1 is illustrative of a multi-station communication system to which the present invention may be adapted;

FIGURE 1*a* depicts the manner in which addresses of substations may be expanded with the present invention;

FIGURE 2 is illustrative of the manner in which a particular terminal is connected to a main transmission line or cable;

FIGURE 3*a* illustrates the manner in which data in serial form may be transmitted by the present invention;

FIGURE 3*b* is illustrative of the manner in which data in parallel form may be transmitted by the present invention;

FIGURE 4 is a schematic diagram illustrating a terminal address decoding circuitry employing the present invention;

FIGURE 5*a* is a schematic diagram showing a decoding circuit for recognizing a start address signal employed by the present invention;

FIGURE 5*b* is a schematic diagram illustrating the decoding circuit to receive a stop address signal employed by the present invention; and FIGURE 6 is a timing diagram illustrating the time relation between the various signals employed by the present invention.

To particularly describe the addressing means of the present invention, reference is made to FIGURE 1, which illustrates in schematic form a relation between a transmitting station and a plurality of receiving terminals, the number of which may be increased, and to FIGURE 1*a* which depicts the addresses for the respective terminals and illustrates the manner in which such addresses may be increased. The particularly advantage of the present invention can be readily described in relation to FIGURE 1*a*. Assume, for example, that the original communication system involved four receiving terminals. In such a situation, only a two digit address would be employed, which addresses would be respectively 00, 01, 10, and 11 when the addresses are represented in binary form. In prior art systems, an expansion of such a system to include five or more terminals would require the conversion of the entire addressing scheme since it would be readily appreciated that the next highest number in binary form would be 100, which would be recognized by terminal 1 as having the sequence of digits 00. In similar fashion, the next highest number in binary form would be 101, which would be recognized by terminal 2 as having sequence of digits 01. To inhibit prior stations from recognizing particular sequences of digits representing their own addresses, the present invention includes the presentation of signals representing the start of an address and stop of an address, which particular signals are represented in FIGURE 1*a* by right and left brackets respectively. With means of recognizing such start and stop signals or brackets, the system of FIGURE 1 could readily be expanded to include additional stations or terminals even though the additional terminals require an address of a greater number of digits.

Consequently, even though the fifth station, for example, would have an address as indicated in FIGURE 1*a* of 000, this address would not be recognizable by terminal 1 having an address of 00, since terminal 1 would only recognize its address in combination with the respective signals indicated by the right and left brackets. Similarly, if it were required to expand the system to say 13 stations or terminals, terminal 13 could have an address of 0000, which nevertheless would not be recognizable by either terminal 5, having an address of 000, or by terminal 1 having an address of 00, since the particular combination of signals, including the start address signal and stop address signal, as indicated by the brackets, would be different for the respective terminals 1, 5 and 13. It will be further appreciated from reference to FIGURE 1 and FIGURE 1*a* that the system could be expanded indefinitely without any requirement for converting the address recognition means of the already existing terminals or stations.

To illustrate the form of the respective signals generated by the apparatus of the present invention, reference will first be made to the address recognition means of the respective terminals as illustrated in FIGURE 4, FIGURE 5*a* and FIGURE 5*b*, and the timing chart of FIGURE 6. It will be understood that the following description in regard to these figures is directed toward address receiving means for a plurality of signals transmitted serially; however, the manner in which a plurality of similar means may be adapted to recognize an address in parallel form will be more fully described at a later point in this specification.

The circuit of FIGURE 4 is one that is adapted to receive a plurality of signals spaced in time for simultaneous recognition thereof, a particular example of which signal pulses are illustrated in FIGURE 6. In order to provide that the sequence of signals in FIGURE 6 correspond graphically to the particular gates of FIGURE 4, the time scale of FIGURE 6 is one that extends from right to left rather than a normal time scale that would extend or increase from left to right. As the incoming address signals arrive at input connection 20 of FIGURE 4, they are passed through a series of delay lines 21 with each delay line delaying the respective pulses by one clock cycle. Thus, at the end of a sufficient number of clock cycles, lead 22 will carry a signal as indicated in FIGURE 6 by the right hand bracket sign, which signal will last for one and a half clock cycles or a time duration as indicated in FIGURE 6 between time $t_0$ and time $t_1$. Similarly, lead 23 will have a signal level that will last for one-half clock cycle and will be as indicated in FIGURE 6 during the time duration from $t_2$ to $t_3$. Lead 24 will have a signal as indicated in FIGURE 6 during time duration $t_4$ and $t_5$. Lead 25 will have a voltage signal as indicated in FIGURE 6 during the time period between $t_6$ and $t_7$. Lead 26 will have a voltage signal as indicated in FIGURE 6 during time period between $t_8$ and $t_9$, and input connection 20 will have a time signal as indicated at FIGURE 6 during the time period $t_{10}$ and $t_{11}$ which is just two complete time cycles. Again, it will be appreciated that because of the respective delay lines illustrated in FIGURE 4, all of these signals will appear simultaneously at their respective gate input leads. Since the particular address to be decoded by the address recognition means of FIGURE 4 have been arbitrarily selected to be 1001, the particular transmission gates 29, 30, 31 and 32 will be chosen to either directly transmit the respective signal or to invert it as required. Thus, for the particular address described, gates 29 and 30 will merely be transmission gates, while gates 30 and 31 will be chosen as inverters, so that when the particular address signal is received, each of the respective gates 29, 30, 31 and 32 will present high or true output signals to AND gate 33.

Of greater importance, however, are respective gates 27 and 28 which decode the start address signal and the stop address signal or the right and left hand bracket signals respectively. The particular circuit of gate 27 is shown in FIGURE 5*a* and is one that is adapted to pass its respective signal through two delay lines 46, each of which have a delay time of one-half clock cycle such that at the time when the respective address signals are at their appropriate gate leads as indicated above, connection 40 of FIGURE 5*a* will be at a signal corresponding to that illustrated in FIGURE 6 at time $t_0$; connection **40*a*** of FIGURE 5*a* will be at a voltage level as indicated in FIGURE 6 at time $t_a$; and connection **40*b* will be at a signal level as indicated in FIGURE 6 at time $t_b$. In this manner, each of the outputs to AND circuit 41 will supply the appropriate high or true signal so that AND circuit 41 will in turn have the appropriate high output signal. Similarly, the stop address gate 28** which is illustrated in FIGURE 5*b* will be of such a nature as to have four delay lines 46 through which the respective signals pass, each one of which again delays its respective signal by one-half clock cycle such that at the appropriate time when the respective address signals arrive at their corresponding decoding gates as indicated in FIGURE 4, input connection 42 of FIGURE 5*b* will have a signal thereon as indicated in FIGURE 6 at time $t_{10}$; input connection **42*c* will have an appropriate signal as indicated in FIGURE 6 at time $t_c$; input connection 42*d* will have a signal thereon as indicated in FIGURE 6 at time $t_d$; input connection 42*e* will have a signal thereon as indicated in FIGURE 6 at time $t_e$; and input connection 42*f* will have an input signal thereon as indicated in FIGURE 6 at time $t_f$. Since AND gate 33 will have a high output signal only when all of the particular signal pulses of FIGURE 6 are applied thereto, it will be appreciated that the circuit of FIGURE 6 will recognize only the address 1001 and no other address even though some other address might contain the same sequence of bits. Once AND gate 33 provides the appropriate output signal, that signal is employed to set flipflop circuit 44 to activate gate 45 which may be just an AND gate to receive the data pulses which follow address pulses. Flipflop circuit 44 will remain in an "on" condition until the address decoder of FIGURE 4 receives a new right bracket or start address signal at gate 27 which address signal is different from the one that the circuit is adapted to recognize, in which case AND gate 33** will not supply any output signal.

The above description for the circuitry of FIGURE 4, FIGURE 5*a*, FIGURE 5*b* and FIGURE 6 has been directed toward employment of the present invention to decode a terminal address presented in serial form, that is a series of signals transmitted as a function of time. However, there will be many instances in which the address is preferred to be supplied in parallel form as when the transmission cable carries a number of signals simultaneously. It will be fully understood that the present invention is adaptable to such transmission and still be able to provide the advantage of an expandable address. For example, in reference to FIGURE 2 there is shown therein an address decoder for a particular substation or terminal where the address is presented in parallel form. In this particular embodiment, the data is transmitted simultaneously over a plurality of conductor leads $1_1, 1_2 \ldots 1_n$ which simultaneously supply the address to address decoders $D_1, D_2 \ldots D_n$, each of the respective address decoders being of the type illustrated in FIGURE 4 except that each decoder will receive only one address bit when the address contains *n* bits or digits. As in the case of serial transmission, the respective address bits to each decoder are preceded in time by a start address signal and followed in time by a stop address signal. For example, if the number of transmission lines is 4 and the number of bits or digits in the address is 4, then each decoder would receive 1 bit of address simultaneously with the other decoder circuits. When it becomes necessary to expand the address to include the additional digits, the system may be expanded to employ addresses of 8 bits or digits by sequentially supplying 2 sets of 4 bits, in which case each decoder would receive 2 bits in serial form which are preceded by a start address signal and subsequently followed by a stop address signal, in a manner as described in relation to FIGURE 4.

The manner in which the respective addresses are generated by the transmitting station will now be discussed for the situation of serial transmission along a single transmission line, although it will be appreciated that this method could be employed for parallel transmission as was just discussed in relation to FIGURE 2. Referring to FIGURE 3*a*, there is shown therein, a mode of transmission of the respective signals representing the address and including the start address signal and the stop address signal, which group of signals is followed by the appropriate data signals. The signals are supplied to a transmission gate where the respective signals are provided with appropriate pulse shape and timed by a clock source. It will be understood that the clock source must be so adapted as to supply pulses of appropriate length for the start address pulse and the stop address pulse as has already been discussed, it being understood that the time duration between the start address pulse and the stop address pulse will depend upon the number of digits in the address.

Similarly, if the address signals and the data signals are supplied to the transmission line in parallel for serial transmission, the respective signals can be converted to serial form by a network of delay lines as illustrated in FIGURE 3*b* where each of the respective signals is supplied to a corresponding AND gate and upon the occurrence of a readout signal to a corresponding connection between a series of delay lines such that the power supply and pulse shaper will generate the required train of pulses in accordance with the appropriate timing as required by the decoder for decoding and recognition of the appropriate address signals.

It will be appreciated that the expandable address feature of the present invention can be employed in many different types of communication or data processing systems. For example, this invention may be employed to address a core memory where it is desirable to be able to expand the memory capacity by employing additional core memory units or the invention may be employed in a data processor where it is desirable to eventually expand the number of I/O devices. The invention also may be employed in various fields of communications as has already been described. One skilled in the art will have no difficulty in drawing the analogy between the devices diagrammatically shown in FIGURE 1 and the hardware employed in a particular system to which the present invention is adapted.

What is claimed is:

1. In a communication system including a transmitting station to transmit and a plurality of receiving stations to receive address signals and data signals, each station having a different address, at least one of said addresses being of a length different from the other addresses, said address signals being preceded by a first signal indicating the beginning of said address and followed by a second signal indicating the end of said address, each of said receiving stations comprising:

means to receive signals representing addresses of only one particular length and said first signal and said second signal; and means responsive to signals representing one particular address and said first signal and said second signal to activate said receiving station to receive data signals.

2. A receiving station according to claim 1 including an address decoder circuitry as said address signal receiving means to simultaneously detect the presence of each of the signals in said address and said first signal and said second signal.

3. A receiving station according to claim 2 wherein said decoder circuitry includes a first signal decoder circuit and a second signal decoder circuit each having an output lead upon which an output signal appears only on the occurrence of said first signal and said second signal respectively, said first signal and said second signal having time durations different from one another and from any data or address signal.

4. A system for transmitting data signals, said system comprising:

means to transmit a plurality of sets of address signals, some of said sets being of different lengths, each set being preceded by a first signal and followed by a second signal;

means coupled to said transmission means to receive sets of address signals of a particular length determined by the time lapse between said first signal and said second signal; and means responsive to one particular set of address signals of said particular length and activated thereby to receive data signals subsequently following said particular set of signals.

5. A communication system comprising:

a transmitting station to transmit data signals and a plurality of address signals at least one of said addresses being of a length different from the other addresses, said address signals being preceded by a first signal indicating the beginning of said address and followed by a second signal indicating the end of said address; and a plurality of receiving stations to receive data signals and said address signals, each of said receiving stations including means to receive signals representing addresses of only one particular length and said first signal and said second signal, and means responsive to signals representing one particular address and said first signal and said second signal to activate said receiving station to receive data signals.

References Cited

UNITED STATES PATENTS

| | | |
|---|---|---|
| 2,617,873 | 11/1952 | Lovell-Foot et al. |
| 2,870,429 | 1/1959 | Hales. |
| 3,257,651 | 6/1966 | Feisel. |
| 3,289,166 | 11/1966 | Emmel. |

JOHN W. CALDWELL, *Primary Examiner.*

HAROLD I. PITTS, *Assistant Examiner.*

U.S. Cl. X.R.

340—163, 167